United States Patent [19]

Ausnit

[11] 4,046,408
[45] Sept. 6, 1977

[54] OMNI-DIRECTIONAL FASTENER

[76] Inventor: Steven Ausnit, 124 E. 61st. St., New York, N.Y. 10021

[21] Appl. No.: 605,984

[22] Filed: Aug. 20, 1975

Related U.S. Application Data

[63] Continuation of Ser. No. 385,408, Sept. 3, 1973, abandoned.

[51] Int. Cl.² .................. F16L 25/00; A44B 17/00
[52] U.S. Cl. .................. 285/188; 24/201 C; 285/423; 285/DIG. 22; 138/111; 150/3
[58] Field of Search ....... 24/201 C, 30.5 P, 205.1 D, 24/204, 206 A, 16 PB, 20 TT, 201 HH; 150/3; 46/DIG. 1, 21, 28, 23, 16, 31, 17, 30; 52/522; 138/128, 168, 111; 174/68 C, 72 A; 285/188, DIG. 22

[56] References Cited

U.S. PATENT DOCUMENTS

| | | | |
|---|---|---|---|
| 2,282,871 | 5/1942 | Malbon | 216/1 |
| 2,888,511 | 5/1959 | Guritz | 24/201 C |
| 3,274,616 | 9/1966 | Russo | 24/204 |
| 3,337,258 | 8/1967 | Steinberg | 24/201 C |
| 3,526,867 | 9/1970 | Keeler | 24/204 |
| 3,537,153 | 11/1970 | Ausnit | 24/201 C |
| 3,542,078 | 11/1970 | Lykle | 24/201 C |
| 3,592,428 | 7/1971 | McFarlane | 24/201 C |
| 3,780,401 | 12/1973 | Reimer | 24/16 PB |
| 3,879,835 | 4/1975 | Brunlik | 221/204 |
| 3,882,630 | 5/1975 | Bianco | 46/28 |

FOREIGN PATENT DOCUMENTS

| | | | |
|---|---|---|---|
| 1,471,561 | 1/1967 | France | 24/30.5 P |
| 2,027,753 | 12/1971 | Germany | 46/23 |

Primary Examiner—Bernard A. Gelak
Attorney, Agent, or Firm—Hill, Gross, Simpson, Van Santen, Steadman, Chiara & Simpson

[57] ABSTRACT

Flexible closure strips to be releasably interlocked wherein each of the closure strips has first and second sets of interlocking profiles with the first set facing in a first lateral direction and the second set facing in the opposite lateral direction and being shaped and sized so that they interlock with each other in either lateral direction.

4 Claims, 10 Drawing Figures

Fig. 4
Fig. 5
Fig. 6
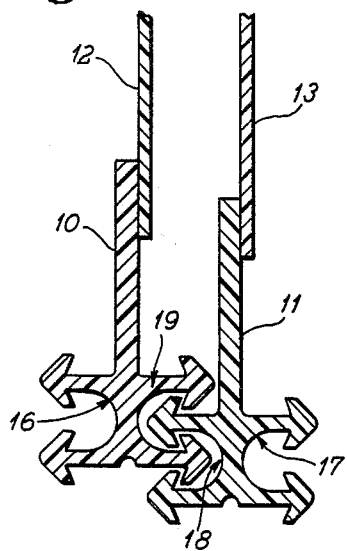
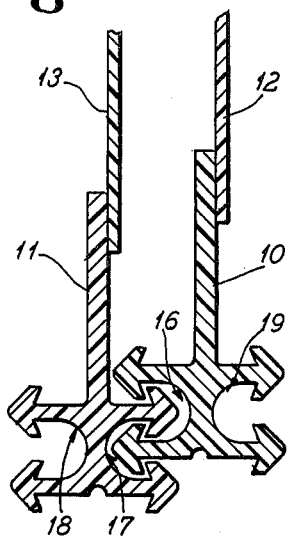
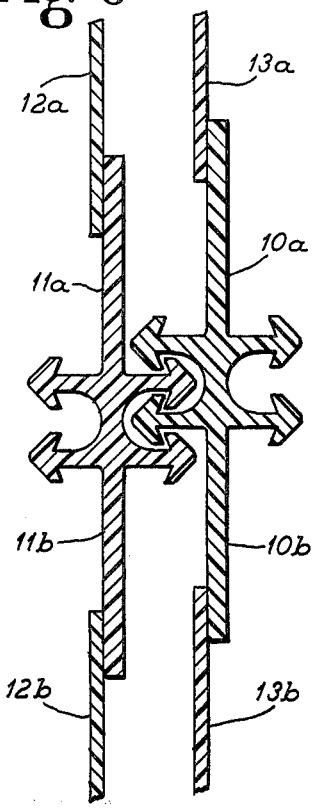
Fig. 7
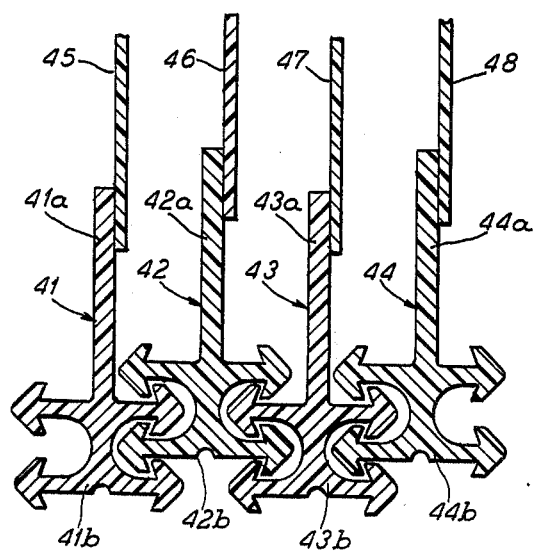
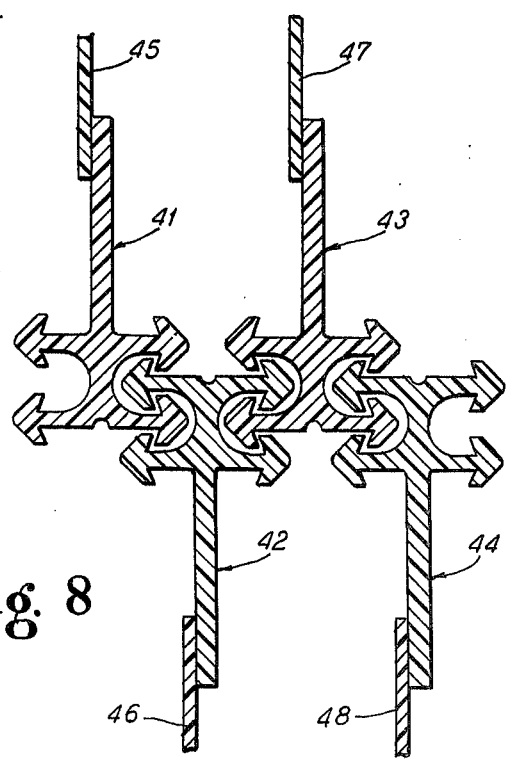
Fig. 8

OMNI-DIRECTIONAL FASTENER

BACKGROUND OF THE INVENTION

The invention relates to improvements in flexible continuous plastic fasteners of the rib and groove type wherein the ribs and grooves are sized and shaped to interlock when pressed together and to be releasable when pulled apart so as to form a flexible reclosable fastener.

This type of fastener is well adapted to being produced by mass production techniques wherein the fastener profiles are extruded by a continuous extrusion process wherein the heated plastic emerges from a die which has an opening sized and shaped to produce interlocking profiles that will be of a precise size and shape when cooled to interlock. These fasteners profiles can be formed as part of a fastener strip which is attached to a sheet or web, or can be formed as an integral part of a plastic film. In either arrangement the profiles function to interlock to join the sheets or permit them to be separated. A conventional us is with a reopenable bag wherein the profiles are formed along the top of the bag to interlock when being pressed together between fingers or when being pressed together by a laterally movable slider. The profiles pull apart when manually drawn apart either by grasping flanges above the profiles or by moving a slider with a separating finger in an opening direction.

In various environments it is desirable to be able to join large sheets together or join the top edges of the bag without concern as to whether the sheets have been correctly positioned. If this concern is eliminated, more speedy handling of the sheets can be effected and greater dexterity obtained for various uses. Heretofore, with fasteners which were specifically designed to interlock, if the user inadvertently laid one of the sheets in the wrong direction, that is, with the face side down, the fasteners would not interlock, and it would require inverting the sheet 180°. Also, in instances where fastener strips were attached to large sheets, care had to be taken so that the strips were attached facing in the right direction unless the sheets were later to be inverted. With very large sheets, covers and tarpaulins, it was frequently difficult to reposition these sheets.

In various applications it is necessary to attach the edges or center portions of sheets to each other, and this can be accomplished by the provision of releasable and pressure closable fastener strips on the sheets. It is often desirable to be able to attach these sheets to each other either in opposing relationship, where they extend toward each other, or in adjacent relationship where they extend in the same direction.

It is accordingly an object of the present invention to provide an improved interlocking profile plastic fastener arrangement which makes it possible for the joining of sheets either in opposing relationship where the sheets extend toward each other or in adjacent relationship where they extend in the same direction, using the same attachment means.

It is an object of the present invention to provide an improved interlocking profile plastic fastener arrangement which eliminates the need for orienting the direction of the fastener strip at the edge of a sheet in either direction and wherein the strip can be attached to a mating strip from either direction.

A further object of the invention is to provide an improved plastic fastener profile structure having a rib and groove attachment means wherein the profile has a unique shape with the groove being formed between two male profiles which are sized and shaped so that either of them are receivable and interlockable into a groove of the size of the groove between them.

A further object of the invention is to provide an improved fastener construction which achieves advantages heretofore not possible with prior art structures which have been available.

Other objects, advantages and features, as well as equivalent structures which are intended to be covered hereby, will become more apparent with the teachings of the principles of the invention in connection with the disclosure of the preferred embodiment in the following specification, claims and drawings, in which:

DESCRIPTION OF THE DRAWINGS

FIGS. 4 and 5 are sectional views illustrating two arrangements in which the structures of FIGS. 1 and 2 may be interlocked showing the flexibility and dexterity of the structure;

FIG. 6 is a sectional view of another form showing the arrangement used for attachment of coextensive sheets;

FIGS. 7 and 8 are sectional views showing the structure of the invention employed for the attachment of a substantial number of sheets;

DESCRIPTION OF THE PREFERRED EMBODIMENTS

Figures 1, 2, 3:
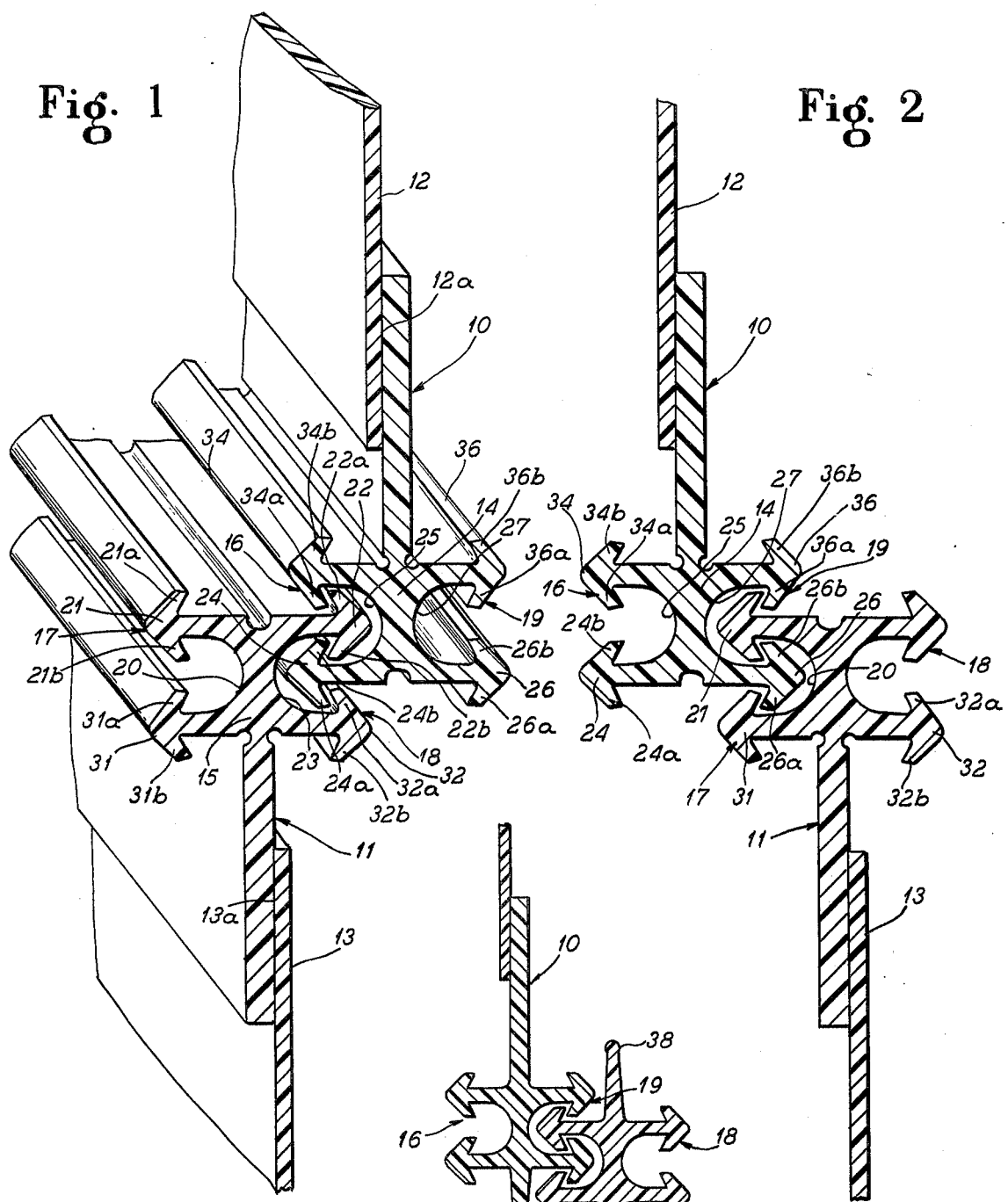
FIG. 1 is a sectional view taken through interlocking strips shown in perspective constructed and operating in accordance with the principles of the present invention.
FIG. 2 is another sectional view of the structures in FIG. 1 illustrating how they may be interlocked in the second interlocking relationship.
FIG. 3 is a sectional view showing another arrangement of the interlocking strips.

FIGS. 1 and 2 illustrate the same structures with FIG. 1 showing the fastener strips interlocked in a first interlocking relationship and FIG. 2 showing them interlocked in a second interlocking relationship. Because these structures are the same, identical numerals are used, and the structure need be described principally only in connection with FIG. 1.

FIG. 1 shows a first fastener strip 10 interlocked with a second fastener strip 11. The first fastener strip is attached to a plastic sheet 12 and the second fastener strip to a plastic sheet 13. Suitable attachment means are provided such as by being heat sealed along the areas 12a and 13a respectively.

The first fastener strip 10 has a resiliently flexible first profile or set of profiles 16 facing in a first lateral direction and a resiliently flexible second set of profiles 19 facing in the opposite lateral direction.

The second strip 11 has resiliently flexible first set of profiles 17 facing in a first lateral direction and a resiliently flexible second set of profiles 18 facing in the opposite lateral direction. These profiles are carried on the head or marginal locking portion 14 of the strip 10 and 15 of the strip 11. As will be observed, each of the fastener strips 10 and 11 has the web and locking portions thereof integrally connected in substantially a common plane, and the web portions provide connecting means.

FIG. 1 shows the first interlocking position wherein the first set of profiles 16 of the first strip 10 interlock with the second set of profiles 18 of the second strip.

FIG. 2 shows the second interlocking position wherein the second set of profiles 19 of the first strip 10 interlock with the first set of profiles 17 of the first strip 11.

Figure 9:
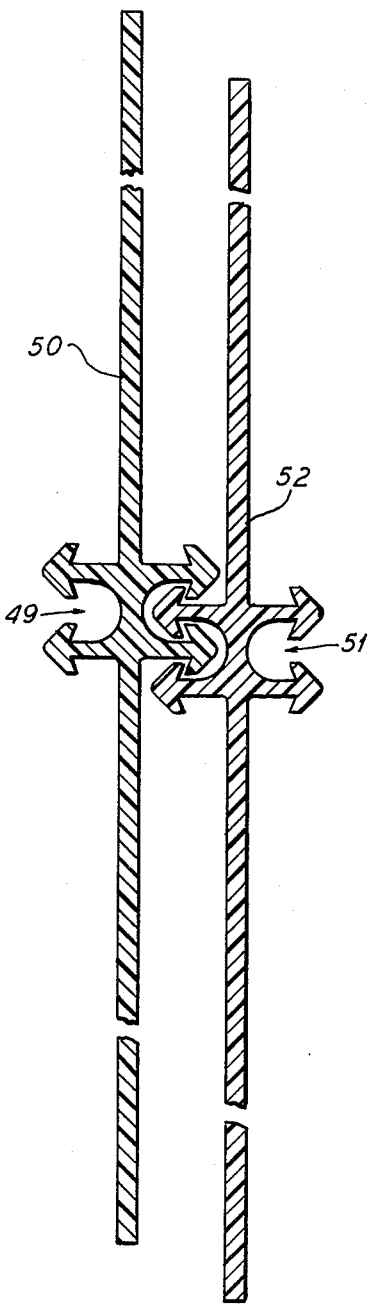
FIG. 9 is a sectional view illustrating fastener profiles integral with film.
Figure 10:
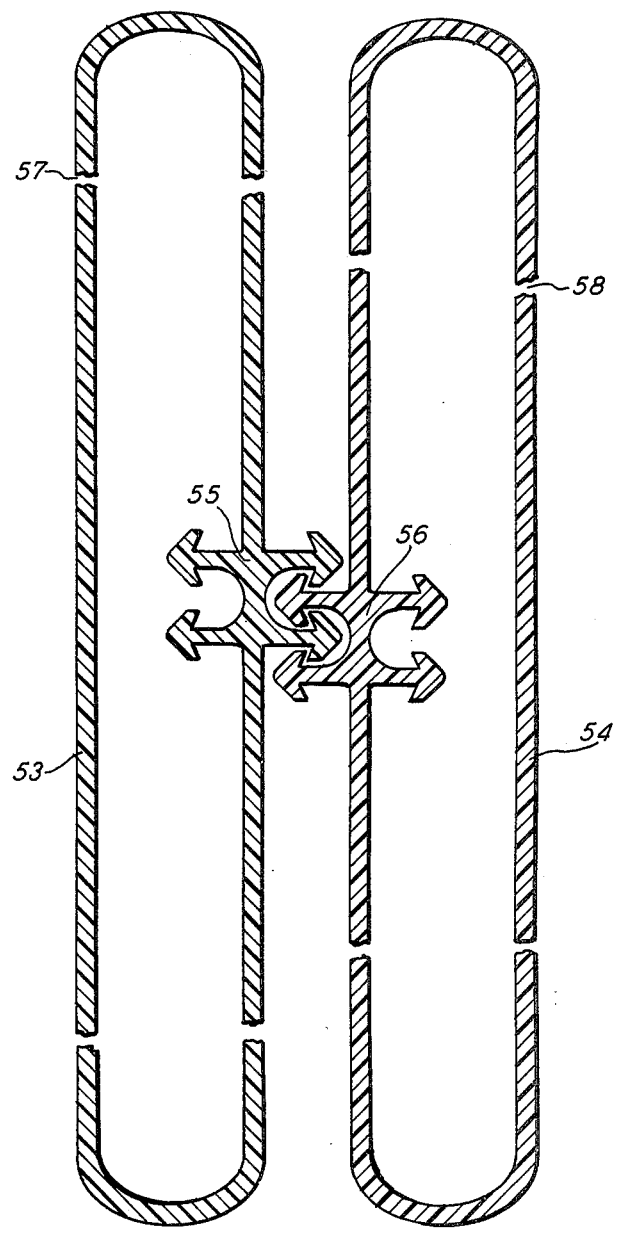
FIG. 10 is a sectional view illustrating fastener profiles integral with the tubular film.

It will be understood that while separate fastener strips 10 and 11 are shown in FIGS. 1 – 8, the structures may be made so that they are integral with the sheet as in FIGS. 9 and 10. Also, particular rib and groove arrangements are shown, and it will be appreciated by those versed in the art that modifications in the shapes of the ribs and grooves may be made without departing from the spirit and scope of the invention. Primarily, each set of profiles which face in each lateral direction includes two ribs and one groove with the ribs and grooves so sized and shaped so as to interlock with the other ribs and grooves of the other strip each of said ribs extends individually from its locking portion and each rib is individually resiliently flexible.

It will also be appreciated that as each strip can be interlocked to another similar strip, a flexible strip may be interlocked with a rigid unit utilizing the principles of the possibility of interlocking from either lateral direction.

The first strip 10 has its first set of profiles 16 comprised of rib elements 24 and 34 which have a groove 25 between them. The rib elements are arrow shaped with a central tip and lateral barbs of the rib 24 shown at 24a and 24b, and of the rib element 34 shown at 34a and 34b. The first profile also includes the groove 25 with overhanging jaws formed on one side by a barb jaw 24b, and with a barb 34a at the other side of the groove.

The first set of profiles of the second strip 11 has similar arrow shaped ribs 21 and 31 with lateral barbs 21a and 31a and 31b respectively. It also has a similar groove 20 withone overhanging barb 21b and the other barb 31a.

The second set of profiles 19 of the first strip 10 include arrow shaped ribs 26 and 36 with barbs 26a and 26b and 36a and 36b respectively. The profile also has a groove 27 with one barb at 36a and the other barb 26b.

The second set of profiles 18 of the second strip 11 includes similar arrow shaped ribs 22 and 32 with barbs 22a and 22b, and 32a and 32b respectively. It also contains a similar groove 23, and one side has the barb 32a and the other side has the barb 22b. The distance between the barbs at each groove is less than the width of each rib between its barbs, so that the ribs can snap into interengagement and the barbs will retain the locking portions of the fasterner strips interlocked.

For interlocking the profiles in the first interlocking relationship of FIG. 1, they are pressed together applying lateral interlocking pressure thereto. They are adapted to be separated by peeling them apart starting from one end of the fastener.

Similarly, the profiles are interlocked as easily from the other direction in their second interlocking relationship as shown in FIG. 2 by being pressed together. They are also adapted to be similarly pulled apart and separated.

FIG. 3 illustrates a structural arrangement very similar to the arrangement shown in FIG. 1 except that opening flaps 38 and 39 have been provided. The flap 38 is integral with the strip 11 and the flap 39 is integral with the strip 10. These flaps may be arranged with slightly bulbous ends for ease of gripping and when pulled apart, will separate the interlocked profiles. It willl be noted that the flaps are equally functional whether the profiles are interlocked in the second interlocking relationship such as shown in FIGS. 2 and 3 or the first interlocking relationship such as shown in FIG. 1. They are also equally functional if the profiles are interlocked with the strips extending in the same direction as illustrated in FIG. 4. Thus, the strips will be interlocked with equal efficiency whether pressed together from either direction. The functional relationship for joining the sheets is the same independent of which direction the strips are attached, or whether they are attached in opposing linear relationship as in FIGS. 1 and 2 or in adjacent parallel relationship as in FIGS. 4 and 5.

Thus, it will be seen that if the strips are assembled to sheets, the strips need not be oriented in either direction. Further, they can be attached to either side of the sheet. The assembler need not be concerned as to which direction the fastener strips are fed onto the sheet. Similarly, the operator need not be concerned as to which direction the strips are brought together when they are to be mated and interlocked. This achieves a saving in time and possible costly mistakes in fabrication. It also avoids the expensive operation of repositioning or rehandling large and difficult to handle sheets. While the arrangement works particularly well with sheets which extend toward each other, the features of the improvement are not limited to that environment, but may also be used with sheets which extend in the same direction or have other orientations.

In a preferred form, the first and second sets of profiles of each of the closure strips are identical. An advantage of this construction, where the rib and groove of each sheet are the same, is that the strips can be arranged so that they will interlock when the sheets 12 and 13 extend parallel to each other and in the same direction, as well as when they extend toward each other as is shown in the arrangement in the drawing of FIGS. 1 and 2. In other words, the sheet 13 may be positioned so it extends in the same direction as the sheet 12, as in FIGS. 4 and 5. In this arrangement the profile set 19 will interlock with the profile set 18, where the sheet 13 is positioned to the right of the sheet 12 as shown in FIG. 4. If the sheet 13 is positioned to the left of sheet 12 as in FIG. 5, and extending in the same direction, the profile set 17 will be interlockable with the profile set 16.

If the sheets are always to be used in a manner so that they extend toward each other, as they do in FIGS. 1, 2 and 3, in some circumstances it may be acceptable to have the first and second set of profiles of dissimilar construction. The requirement is still present, of course, that the second set of profiles 18 be complementary to interlock with the first set of profiles 16. Also, the first set of profiles 17 must be complementarily shaped with respect to the second set of profiles 19 to interlock therewith. By having each set of profiles include both a ribs and a groove, the additional dexterity is obtained that the sheets may also extend in the same direction, as above discussed.

The arrangement of FIG. 6 illustrates that the fastener strips may be provided with opposing webs on each side. That is, one strip has the web 10a on one side and the web 10b on the other side, which webs may be respectively attached to plastic sheets 13a and 13b.

Similarly, the other strip has a web 11a on one side and a web 11b on th other side which may be respectively attached to plastic sheets 12a and 12b. These webs make it possible to selectively attach plastic sheets to either side so that the fastener strips may be rolled off of a roll in the same direction regardless of whether a single sheet is to be attached thereto on either side or whether two sheets are to be attached. This also makes it possible for each profile to be lockingly engaged by another profile from either direction, or from both directions.

FIG. 7 illustrates the principles of the invention employed so as to attach a substantial plurality of sheets. A group of profile strips are shown, 41, 42, 43, and 44. Each has a web portion 41a, 42a, 43a and 44a respectively and a marginal or profile carrying locking portion 41b, 42b, 43b and 44b. The web portions are attached respectively to plastic sheets 45, 46, 47 and 48. These sheets are attached to each other in the interlocked relationship of the strips that is shown in FIG. 7 with the sheets extending parallel to each other. Where the sheets extend in the opposing direction, the arrangement appears as shown in FIG. 8 so that sheets 45 and 47 extend in one direction and sheets 46 and 48 extend in the opposite direction. With the same profile strips, interlocking is possible and effective. It will be seen from comparing FIGS. 7 and 8 that the sheets may extend toward each other or in the same direction in any combination and the construction of the strips makes interlocking possible. This feature of the strips makes it possible to attach the strips to extra large sheets which are oriented in any position by merely positioning the strips so that their web portion is adjacent the sheet.

FIG. 9 illustrates the principles of the invention employed wherein the profile structures 49 and 51 are formed integral with the sheets 50 and 52. Continuous plastic sheets 50 and 52 may be manufactured in an extrusion process, and the uniquely shaped double gripping profiles 49 and 51 formed with the sheets in the same extrusion process. Again, this construction permits attaching the sheets in either direction.

FIG. 10 illustrates an arrangement wherein the profiles 55 and 56 are made respectively integral with plastic tubes 53 and 54. Each tube and its profile may be manufactured by a single extrusion operation, and the completed tube will be provided with an attachment means for attaching to another tube. Additional profiles may be provided at additional locations on the tube such as in the area shown by the breaks 57 and 58. These additional profiles will be attachable to other profiles in the same tube to divide the tube into compartments. By providing spaced profiles around the circumference of the tube, the profiles can be selectively joined to divide the tube into compartments of different sizes, and the same profiles can be used to attach to other tubes or other sheets on the outside of the tubes.

It will be understood that herein the reference to a fastener strip is not to be limiting to the size or width of the strip but is to include fastener profiles which are integral with a continuous sheet or part of a strip which is attached to another sheet.

I claim as my invention:

1. A fastener assembly comprising in combination:
    first and second interlockable resiliently flexible fastener strips each having a continuous sheet form longitudinally extending web portion and each having a resiliently flexible longitudinally extending locking portion;
    each of said fastener strips having said web and locking portions thereof integrally connected in substantially a common plane, and said web portion providing connecting means;
    each locking portion having a first two continuous shaped locking profile ribs extending therealong and projecting a first lateral direction;
    each locking portion having a second two shaped locking profile ribs extending continuously therealong projecting in a second opposite direction;
    each of said ribs projecting individually from its locking portions
    each of said first and second two shaped ribs of each locking portion having a continuous locking groove therebetween interlockingly receptive of the locking profile of sid ribs and either of said two ribs of either locking portion being adapted to interlock into either of the grooves of the other locking portion;
    said grooves being of the same size on both sides of said locking portions and said ribs being of the same sized on both of said locking portions so that said fastener strips may be interlocked from either lateral direction;
    each web portion extending in a respective plane which is substantially parallel to the plane of the other web portion when the ribs and grooves are interlocked;
    each of said ribs being individually resiliently flexible and being arrow shaped with a central tip and barbs extending laterally at each side of the tip so that in the interlocked relation of the fastener strips two selected ribs of the first strip will be interlocked with two selected ribs of the second strip;
    and the distance between said barbs at each groove being less than the width of each rib between its barbs so that the ribs can snap into interengagement and the barbs will retain the locking portion interlocked.

2. A fastener assembly constructed in accordance with claim 1:
    including plastic film sheets attached to each of the web portions and extending away from the locking portions to form a continuation of the web portions.

3. A fastener assembly constructed in accordance with claim 1:
    including a second web portion for each of the fastener strips on the opposite side of the locking portion and extending in substantially a common plane with the first mentioned web portion and the locking portion.

4. A fastener assembly constructed in accordance with claim 3:
    wherein said first and second web portions are continuous to form a tube with said locking portions being located in the wall of the tube.

* * * * *